US012754521B2

(12) United States Patent
Pareek et al.

(10) Patent No.: US 12,754,521 B2
(45) Date of Patent: Oct. 6, 2026

(54) METHOD AND SYSTEM FOR REAL TIME TRAJECTORY OPTIMIZATION

(71) Applicant: Tata Consultancy Services Limited, Mumbai (IN)

(72) Inventors: Aditya Pareek, Pune (IN); Vishnu Swaroopji Masampally, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 699 days.

(21) Appl. No.: 17/760,297

(22) PCT Filed: Apr. 9, 2021

(86) PCT No.: PCT/IN2021/050356

§ 371 (c)(1),
(2) Date: Aug. 5, 2022

(87) PCT Pub. No.: WO2021/205479

PCT Pub. Date: Oct. 14, 2021

(65) Prior Publication Data

US 2023/0104214 A1 Apr. 6, 2023

(30) Foreign Application Priority Data

Apr. 9, 2020 (IN) ............................ 202021013362

(51) Int. Cl.
*G06F 18/22* (2023.01)
*G05B 13/02* (2006.01)
(Continued)

(52) U.S. Cl.
CPC ......... *G05B 13/028* (2013.01); *G05B 13/045* (2013.01); *G06F 18/22* (2023.01); *G06F 18/27* (2023.01); *G06N 5/022* (2013.01)

(58) Field of Classification Search
None
See application file for complete search history.

(56) References Cited

U.S. PATENT DOCUMENTS 6,289,508 B1 9/2001 Erickson et al.
7,315,846 B2 1/2008 Hartman et al.
(Continued)

FOREIGN PATENT DOCUMENTS

EP 4708112 A1 * 3/2026 ............. G06F 30/12
WO WO-2024200931 A1 * 10/2024 .......... B60W 30/143

OTHER PUBLICATIONS

Pfeiffer, A., "Optimization Library for Interactive Multi-Criteria Optimization Tasks", 9th International Modelica Conference, Date: 2012, Publisher: Research Gate, http://citeseerx.ist.psu.edu/viewdoc/download?doi=10.1.1.469.1667&rep=rep1&type=pdf.
(Continued)

*Primary Examiner* — Jennifer L Norton
(74) *Attorney, Agent, or Firm* — Finnegan, Henderson, Farabow, Garrett & Dunner, LLP

(57) ABSTRACT

Trajectory optimization is process of designing a trajectory of operating variables that optimizes measure of performance while satisfying a set of constraints, when the system moves from one state to another. It is very necessary to achieve optimization in real time. A system and method for real-time trajectory optimization has been provided. The trajectory optimization of a process can be performed in any dynamical automated system. The system is configured to optimize the trajectory in both online and offline mode. In the online mode, the system optimizes the trajectory of the process in real-time. The system has the ability to handle both machine learning and deep learning based time series models along with first principles based models represented by ordinary/partial differential equation or differential algebraic equation based dynamic models of the process to
(Continued)

estimate process variables given the disturbance profile and the actuation profile of manipulated variables.

19 Claims, 10 Drawing Sheets

(51) Int. Cl.

| | |
|---|---|
| ***G05B 13/04*** | (2006.01) |
| ***G06F 18/27*** | (2023.01) |
| ***G06N 5/022*** | (2023.01) |

(56) References Cited

U.S. PATENT DOCUMENTS

| | | | | |
|---|---|---|---|---|
| 9,043,061 | B2 * | 5/2015 | Sujan | B60W 10/08 701/99 |
| 9,760,067 | B2 | 9/2017 | Havlena | |
| 9,926,852 | B2 | 3/2018 | Tiwari et al. | |
| 10,551,842 | B2 * | 2/2020 | Lonari | B60W 10/06 |
| 10,678,253 | B2 | 6/2020 | Zeng et al. | |
| 10,969,775 | B2 * | 4/2021 | Khalate | G06N 5/045 |
| 11,086,276 | B2 * | 8/2021 | Wenzel | G05B 13/048 |
| 11,279,351 | B2 * | 3/2022 | Schmidt | B60W 30/18163 |
| 12,585,255 | B2 * | 3/2026 | Cella | B62D 15/0215 |
| 2003/0149493 | A1 * | 8/2003 | Blevins | G05B 13/048 700/19 |
| 2004/0260421 | A1 * | 12/2004 | Persson | D21G 9/0018 162/263 |
| 2006/0278449 | A1 * | 12/2006 | Torre-Bueno | B60K 6/46 180/65.29 |
| 2011/0060424 | A1 * | 3/2011 | Havlena | G05B 13/048 700/29 |
| 2011/0295501 | A1 * | 12/2011 | Gutierez-Castaneda | G05D 1/00 701/528 |
| 2014/0163789 | A1 * | 6/2014 | Yu | B60W 20/13 903/930 |
| 2015/0046000 | A1 * | 2/2015 | Zhao | B60W 10/08 903/930 |
| 2016/0258361 | A1 * | 9/2016 | Tiwari | G06Q 10/06 |
| 2017/0061817 | A1 | 3/2017 | Mettler | |
| 2017/0306871 | A1 * | 10/2017 | Fuxman | F02D 41/1401 |
| 2018/0364725 | A1 * | 12/2018 | Lonari | B60W 30/188 |
| 2019/0259108 | A1 | 8/2019 | Bongartz et al. | |
| 2019/0361456 | A1 | 11/2019 | Zeng et al. | |
| 2019/0384255 | A1 * | 12/2019 | Krishnaswamy | G05B 23/024 |
| 2021/0012190 | A1 * | 1/2021 | Murali | G06F 17/11 |
| 2021/0223768 | A1 * | 7/2021 | Khalate | G05B 23/0221 |
| 2022/0299952 | A1 * | 9/2022 | Salhov | G05B 13/048 |
| 2023/0419225 | A1 * | 12/2023 | Iyengar | G06Q 10/04 |
| 2024/0176319 | A1 * | 5/2024 | Risbeck | F24F 8/10 |
| 2025/0315031 | A1 * | 10/2025 | You | G05B 19/4184 |
| 2026/0037522 | A1 * | 2/2026 | Majmudar | G06F 16/24522 |
| 2026/0106787 | A1 * | 4/2026 | Mandulapally | H04L 41/0609 |

OTHER PUBLICATIONS

International Search Report and Written Opinion mailed Oct. 14, 2021, in International Application No. PCT/IN2021/050356; 10 pages.

* cited by examiner

METHOD AND SYSTEM FOR REAL TIME TRAJECTORY OPTIMIZATION

PRIORITY CLAIM

The present application is a U.S. National Stage Filing under 35 U.S.C. § 371 and claims priority from International Application No. PCT/IN2021/050356, filed on 9 Apr. 21, which application claims priority from Indian Application No. 202021013362, filed on 26 Mar. 2020. The entire contents of the aforementioned applications are incorporated herein by reference.

TECHNICAL FIELD

The embodiments herein generally relate to the field of control systems. More particularly, but not specifically, the present disclosure provides a method and system for real time trajectory optimization of dynamical systems or processes.

BACKGROUND

Generally, manufacturing or industrial plants or any automated processes are dynamic in nature, evolving with time due to changes in environmental conditions, equipment health, and operational regime in accordance with business requirements. It is imperative to drive the operations to improve key performance measures of such a dynamical system or process. The various constraints on the operation of a dynamical system too need to be respected. For example, constraints can exist on the control system in the form of actuator limits, operational constraints, economical restrictions, and/or safety restrictions. Accordingly, real-time optimization of such a multivariable constrained dynamic system is extremely complex. However, it is essential to optimize the trajectory of processes involved in such systems for improving the performance of the dynamical system. Trajectory optimization in simple terms, is the process of designing a trajectory of operating variables that minimizes (or maximizes) some measure of performance while satisfying a set of constraints, when the system moves from one state to another.

Currently, such complex dynamical systems comprising industrial plants or processes, physiological systems, are not controlled with an aim to optimize the overall performance but by maintaining critical process parameters fixed at some well-defined set points, where these set points are fixed on the basis of lab-scale or pilot plant studies or safe operating regime of each critical process parameter. Design of experimental methodology which may occasionally work for steady state optimization is not feasible for trajectory optimization of dynamical systems since such an optimization problem is infinite dimensional in nature and conducting such large number of experiments is infeasible.

A system and method for trajectory optimization of dynamical system or process for e.g. manufacturing processes in real time is not available. Trajectory optimization is mostly seen as an offline optimization exercise. However, the real time/online implementation in manufacturing plant will be affected by disturbances, the distribution of those can be markedly different from those considered while optimizing the system in the off-line mode.

SUMMARY

The following presents a simplified summary of some embodiments of the disclosure to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for real time trajectory optimization of a process. The system comprises a data receiver, storage and transmitter unit, one or more hardware processors, a memory. The data receiver, storage and transmitter unit receives a plurality of data from one or more sources as an input data. The memory is in communication with the one or more hardware processors. The memory further comprises a preprocessor and data integration unit, a classifier unit, a forecasting unit, a selection unit, a model prediction unit, a monitoring unit, an adjustment unit, and a trajectory estimation unit. The preprocessor and data integration unit preprocesses and integrating the input data. The classifier unit classifies the preprocessed input data among a set of disturbance variables, a set of process variables, a set of manipulated variables, a set of material properties, and a set of design parameters, wherein the classification information is stored in a variable information library. The forecasting unit forecasts an expected profile of each of the set of disturbance variables using their respective models. The selection unit fetches the most appropriate actuation profiles of manipulated variables from a knowledgebase based on a predefined condition for an applicable set of design parameters and forecasted expected profiles of the set of disturbance variables and implementing the most appropriate actuation profiles of the set of manipulated variables by informing a set of actuators using the data receiver, storage and transmitter unit, wherein the set of actuators are part of a process. The model prediction unit predicts expected profile of each of the process variables using their respective models. The monitoring unit monitors the set of disturbance variables, the set of process variables, objectives, and constraints of the process in real time to observe one or more changes. The adjustment unit adjusts the constituents of the trajectory optimization model in response to the one or more changes observed while monitoring. The trajectory estimation unit re-estimates the actuation profiles of manipulated variables using the adjusted constituents, and communicating to data receiver, transmitter, and storage unit.

In another aspect, the embodiment here provides a method for real time trajectory optimization of a process. Initially, via a data receiver, storage and transmitter unit, a plurality of data is received from one or more sources as an input data. The input data is then preprocessed and integrated. Further, the preprocessed and integrated input data is classified among one of a set of disturbance variables, a set of process variables, a set of manipulated variables, a set of material properties, and a set of design parameters, wherein the classification is stored in a variable information library. In the next step an expected profile of each of the set of disturbance variables is forecasted using respective models. Further, most appropriate actuation profiles of the set of manipulated variables is fetched corresponding to a trajectory optimization model from a knowledgebase, based on a predefined condition for an applicable set of design parameters, the set of material properties, and expected profiles of the set of disturbance variables. The most appropriate actuation profiles of the set of manipulated variables is then implemented by informing a set of actuators, wherein the set of actuators are part of the process. Further, the expected profile of each of the set of process variables is predicted using their respective models. The set of disturbance variables, the set of process variables, objectives, and constraints of the process are then monitored in real time to observe one or more changes. Further, constituents of a trajectory optimization model is adjusted in response to the one or more changes observed while monitoring. The actuation profiles of manipulated variables are then re-estimated using the adjusted constituents. And finally, the re-estimated actuation profiles of manipulated variables is implemented by informing the set of actuators.

In another aspect, the embodiment here provides a method for trajectory optimization of a process in an offline mode. Initially, a plurality of historical data is received from one or more sources as an input data. The input data is then preprocessed and integrated. Further, the preprocessed input data is classified among a set of disturbance variables, a set of process variables, a set of manipulated variables, a set of design parameters, and a set of material properties corresponding to the process, wherein the classification is stored in a variable information library. Later, existing models or creating new models of the set of process variables and the set of disturbance variables corresponding to pre-defined objectives and constraints are updated, wherein the updated or created models are stored in a model database, wherein each of the models comprising a trajectory optimization model. In the next step, the trajectory optimization model is solved for finding the extrema of the predefined objectives while satisfying the predefined constraints for the defined profiles of the set of disturbance variables and defined values of the set of design parameters and the set of material properties, wherein the solution of the trajectory optimization model results in the generation of actuation profiles of the set of manipulated variables, and expected profiles of objectives, constraints and the set of process variables. Further, the generated actuation profiles of the set of manipulated variables are approximated depending on the actuation capabilities of a set of actuators, wherein each of the set of actuators corresponds to a manipulated variable. Further, the solution of trajectory optimization model, and a set of constituents of the trajectory optimization model are stored in a knowledgebase, wherein the set of constituents include a set of objectives, constraints, design parameters, a set of material properties, models of the process and disturbance variables, profiles of disturbance variables, and an initial state of the set of process variables, and computational time to solve the trajectory optimization model.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in a computer-readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
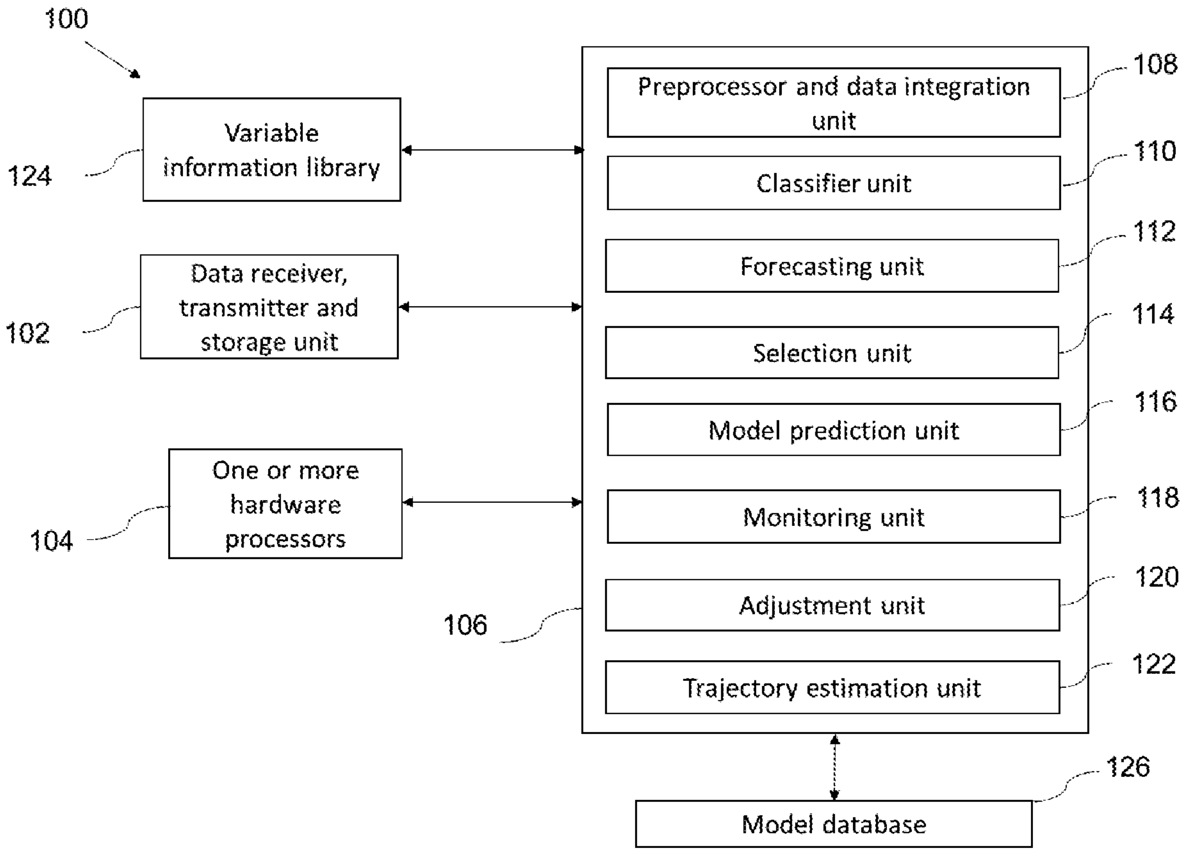
FIG. 1 shows a block diagram of a system for real time trajectory optimization of a process according to an embodiment of the present disclosure.
Figure 2:
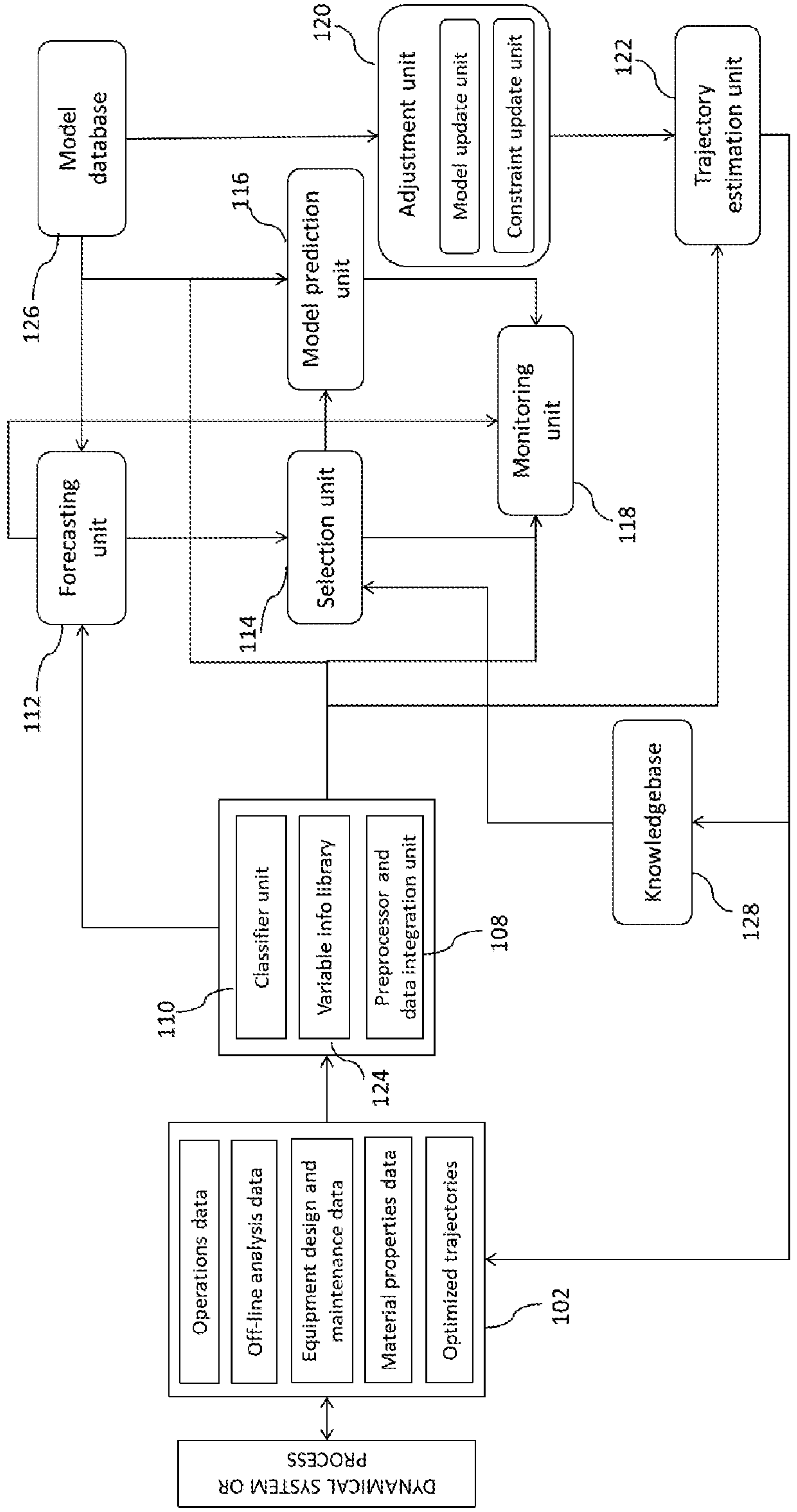
FIG. 2 shows a schematic diagram of real time trajectory optimization of a process in a dynamical system according to an embodiment of the present disclosure.

Exemplary embodiments are described regarding the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

According to an embodiment of the disclosure, a system 100 for real-time trajectory optimization is shown in the block diagram of FIG. 1. The trajectory optimization of a process can be performed in any dynamical automated system. The dynamical system may include any industrial system such as chemical, food or mineral processing plant, oil refinery, power plant, etc. The dynamical system may also include a parallel hybrid electric vehicle or a diabetes patient equipped with continuous glucose monitoring sensor and insulin pump that facilitate online monitoring and actuation. The system 100 is configured to optimize the trajectory in both online and offline mode. In the online mode, the system 100 optimizes the trajectory of the process in real-time. The system 100 has the ability to handle both machine learning and deep learning based time series models along with first principles based models represented by ordinary differential equation/partial differential equation/ differential algebraic equation based dynamic models of the process to estimate process variables given the disturbance profile and the actuation profile of manipulated variables.

The system 100 is a generic system to define a trajectory optimization model and to estimate the actuation profiles of manipulated variables by identifying a suitable technique integrated in the system. The system 100 provides online adaptation of optimized trajectory in response to forecasted disturbances encountered while operation of a process in the dynamical system.

According to an embodiment of the disclosure, the system 100 for performing trajectory optimization of a process involved in the dynamical system accomplishes this by performing two major steps. First, configuring a trajectory optimization model and solving it at least once off-line. The system 100 provides actuation profiles of manipulated variables that result in optimized objectives while satisfying any constraints placed. The solution is stored along with constituents that are used to define and configure the trajectory optimization model. And second, during online trajectory optimization of the process, already available solution is implemented by communicating it to relevant actuators present in the dynamical system. The performance of the dynamical system is monitored, and in case performance is found to be going off-track, changes are made to actuations profiles for the remaining course of time.

According to an embodiment of the disclosure, the system 100 comprises a data receiver, storage and transmitter unit 102, one or more hardware processors 104 and a memory 106 in communication with the one or more hardware processors 104 as shown in the block diagram of FIG. 1. The one or more hardware processors 104 work in communication with the memory 106. The one or more hardware processors 104 are configured to execute a plurality of algorithms stored in the memory 106. The memory 106 further includes a plurality of units for performing various functions. The memory 106 comprises a preprocessor and data integration unit 108, a classifier unit 110, a forecasting unit 112, selection unit 114, a model prediction unit 116, a monitoring unit 118, an adjustment unit 120, and a trajectory estimation unit 122. The memory 106 may further comprise other units for performing certain functions.

According to an embodiment of the disclosure, the data receiver, storage and transmitter unit 102 (Input/Output interface) is configured to receive a plurality of data from one or more sources as an input data. The one or more sources comprises one or more of a distributed control system (DCS), a supervisory control and data acquisition (SCADA) system, a laboratory information management system (LIMS), an enterprise resource planning (ERP) system, a manufacturing execution system (MES), a manufacturing operations management (MOM) system, and a plurality of sensors present in the dynamical system. The data receiver, storage and transmitter unit 102 is accessible to the user via smartphones, laptop or desktop configuration thus giving the user the freedom to interact with the system 100 from anywhere anytime. The data receiver, storage and transmitter unit 102 may include a variety of software and hardware interfaces, for example, interfaces for peripheral device(s), such as a keyboard, a mouse, an external memory, a camera device, and a printer. The data receiver, storage and transmitter unit 102 can facilitate multiple communications within a wide variety of networks and protocol types, including wired networks, for example, local area network (LAN), cable, etc., and wireless networks, such as Wireless LAN (WLAN), cellular, or satellite.

According to an embodiment of the disclosure, the memory 106 comprises the preprocessor and data integration unit 108. The preprocessor and data integration unit 108 is configured to preprocess, synchronize, and integrate the data coming from various sources. The preprocessing may include outlier or anomaly detection in the input data, missing pattern analysis and variable rejection in the input data, and may further perform data imputation to fill in the missing values in the data wherever required.

According to an embodiment of the disclosure, the memory 106 comprises the classifier unit 110. The classifier unit 110 is configured to classify the preprocessed input data among a set of disturbance variables, a set of process variables, a set of manipulated variables, a set of design parameters, and a set of material properties wherein the classification is stored in a variable information library 124. The variable information library 124 stores information regarding sensors, actuators, and other such variables utilized in describing the dynamical system. This may include grouping information of each variable in terms of one of design parameter, manipulated variable, and disturbance variable. It may further include information of appropriate bounds on absolute values and actuation time of the sensors these variables correspond to, sampling time of these variables. Furthermore, information regarding which model file each variable is associated with may also be present.

According to an embodiment of the disclosure, the memory 106 comprises the forecasting unit 112. The forecasting unit 112 is configured to forecast an expected profile of each of the set of disturbance variables using their respective models. The expected profile of the set of disturbance variables is forecasted using either current data or by making predictions using models of set of disturbance variables present in the model database 126.

According to an embodiment of the disclosure, the memory comprises the selection unit 114. The selection unit 114 is configured to fetch the most appropriate actuation profiles of manipulated variables from a knowledgebase 128 based on a predefined condition for an applicable set of design parameters, material properties, and forecasted profiles of the set of disturbance variables. The selection unit 114 can identify the most appropriate actuation profiles of manipulated variables by calculating a similarity score between the forecasted profiles of the set of disturbance variables and each of the respective profiles already stored in the knowledgebase 128 for the similar set of design parameters, and material properties. And later, the most appropriate actuation profiles are selected for which the similarity score measure is found to be maximum. Distance measure can be one of the methods to calculate the similarity score. For e.g. inverse of Euclidean distance or inverse of Mahalanobis distance, or any similar distance measure or a weighted sum of distance measures computed using different distance estimation techniques, can be used as a similarity score.

According to an embodiment of the disclosure, the data receiver, storage, and transmitter 102 is also configured to implement the most appropriate actuation profiles of the set of manipulated variables by informing a set of actuators. The set of actuators constitute part of the hardware of the dynamical system.

According to an embodiment of the disclosure, the memory 106 comprises the monitoring unit 118 and the adjustment unit 120. The monitoring unit 118 is configured to monitor the set of disturbance variables, the set of process variables, objectives, and constraints of the process in real-time to observe one or more changes. The adjustment unit 120 is configured to adjust constituents of the trajectory optimization model in response to the one or more changes observed while monitoring.

According to an embodiment of the disclosure, the monitoring is performed by following a three-level hierarchical process. First, by computing the difference between the forecasted profiles and the measured profiles of the set of disturbance variables as per the recent data. Second, by computing the difference between the predicted profiles and the currently measured profiles of the set of process variables with former estimated by performing the model predictions on the recent data. The model prediction unit 116 is configured to predict relevant process variables corresponding to the dynamical system or processes. Finally, the third level of monitoring is accomplished by checking whether all the constraints are satisfied and in case some of the constraints are violated, the amount by which each constraint is violated is calculated. The computed differences during monitoring can represent an instantaneous difference or an integrated difference. Error estimates such as mean squared error, root mean squared error, mean absolute percentage error and like can be used as a measure of difference. Depending on the output of the monitoring, the adjustment unit 120 adjusts the constituents of the trajectory optimization model to aid correction of trajectories of process variables such that performance of a process is optimized in online setting too.

According to an embodiment of the disclosure, the adjustment unit 120 is configured to perform one or more of the following actions comprising:

- Updating the forecast of the set of disturbance variables using recent data or by updating the models of the set of disturbance variables if the difference between the expected profile and actual profile of disturbance variables is more than a first threshold.
- Updating the models of the set of process variables if the difference between the expected profile and actual profile of the set of process variables is more than a second threshold, or
- Relaxing limits on the constraints if constraints are not satisfied and if there is a scope of relaxing the limits on the constraints.

According to an embodiment of the disclosure, the adjustment unit 120 further comprises the model update unit. The model update unit is configured to update the existing models of the set of process variables and the set of disturbance variables that appear in pre-defined objectives and constraints. The updated models are stored in a model database 126 with each of the models corresponding to a process or disturbance variable referred in objective and constraint functions of a trajectory optimization model. The models for the set of process variables include one or more of machine learning (ML) models, deep learning (DL) models, and first-principles based models. On the other hand, the models for the set of disturbance variables include one or more auto-regressive machine learning or deep learning models. The objectives and constraints that define the trajectory optimization model are normally defined in terms of the set of process variables, the set of manipulated variables, and the set of design parameters.

According to an embodiment of the disclosure, the memory 106 comprises the trajectory estimation unit 122. The trajectory estimation unit 122 is configured to re-estimate the actuation profiles of manipulated variables using the adjusted constituents.

Figure 3:
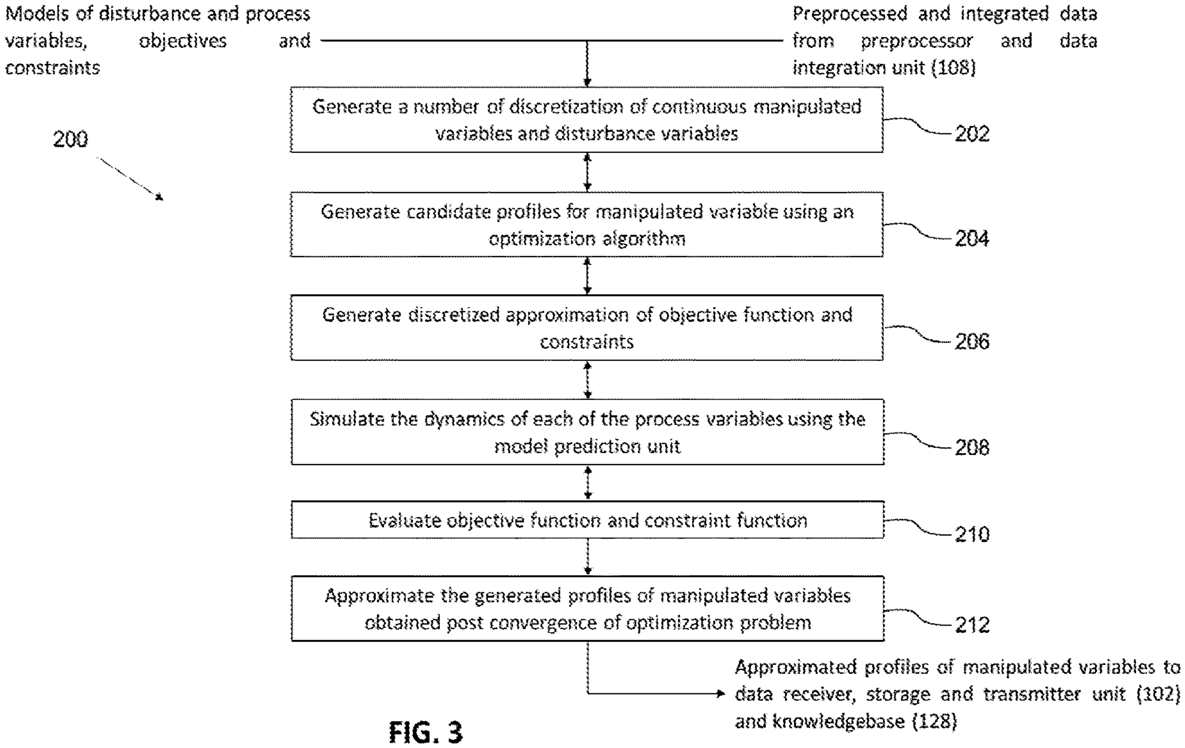
FIG. 3 shows a flowchart of one of the methods implemented in trajectory estimation unit according to an embodiment of the present disclosure.

An example method implemented in trajectory estimation unit 122 to solve trajectory optimization model and thus estimate actuation profiles of manipulated variables and resulting trajectories of process variables that optimize the performance of a process is shown in flowchart 200 of FIG. 3. The models of disturbance and process variables, objectives and constraints and the preprocessed and integrated data from preprocessor and data integration unit 108 is provided as input. At step 202, a number of discretization of continuous manipulated variables and disturbance variables is generated. At step 204, candidate profiles are generated for manipulated variables using an optimization algorithm. At step 206, the discretized approximation of objective function and constraints is generated. At step 208, the dynamics of each of the process variables is simulated using the model prediction unit. At step 210, the objective function and the constraint function is evaluated. And finally, at step 212, the generated profiles of the manipulated variables obtained post convergence of optimization problem are approximated. The optimization problem can be solved using a suitable technique depending on the nature of the optimization problem. The approximated profiles of manipulated variables are provided to the data receiver, storage and transmitter unit 102 and the knowledgebase 128.

The re-estimation of the actuation profiles can be performed by one of the following methods depending on limitations on computational time and actuation requirements of relevant sensors. By solving the trajectory optimization model with adjusted constituents for relatively short horizon in succession or by solving the trajectory optimization for the remaining horizon with adjusted constituents and the most recent data obtained from preprocessor and data integration unit. The horizon may refer to duration of time, space, or sequence of events. An event in the sequence of events may refer to each of the tests performed in the plant while searching for an operational configuration that meets the operational objectives. After re-estimation of actuation profiles of manipulated variables, the data receiver, storage and transmitter unit 102, corrects the course of process by communicating the solution to the set of actuators.

According to an embodiment of the disclosure, the models are updated either by tuning hyper-parameters or by re-training machine or deep learning (ML/DL) models by incorporating newly collected data. Whereas, the parameters of first-principles based models are re-fitted with newly collected data. Standard techniques such as k-fold validation can be used for model selection, hyper-parameter tuning and re-training ML/DL models. While non-linear optimization techniques such as Levenberg-Marquardt or Newton's method can be used to fit parameters of the first-principles based models.

Figure 4A:
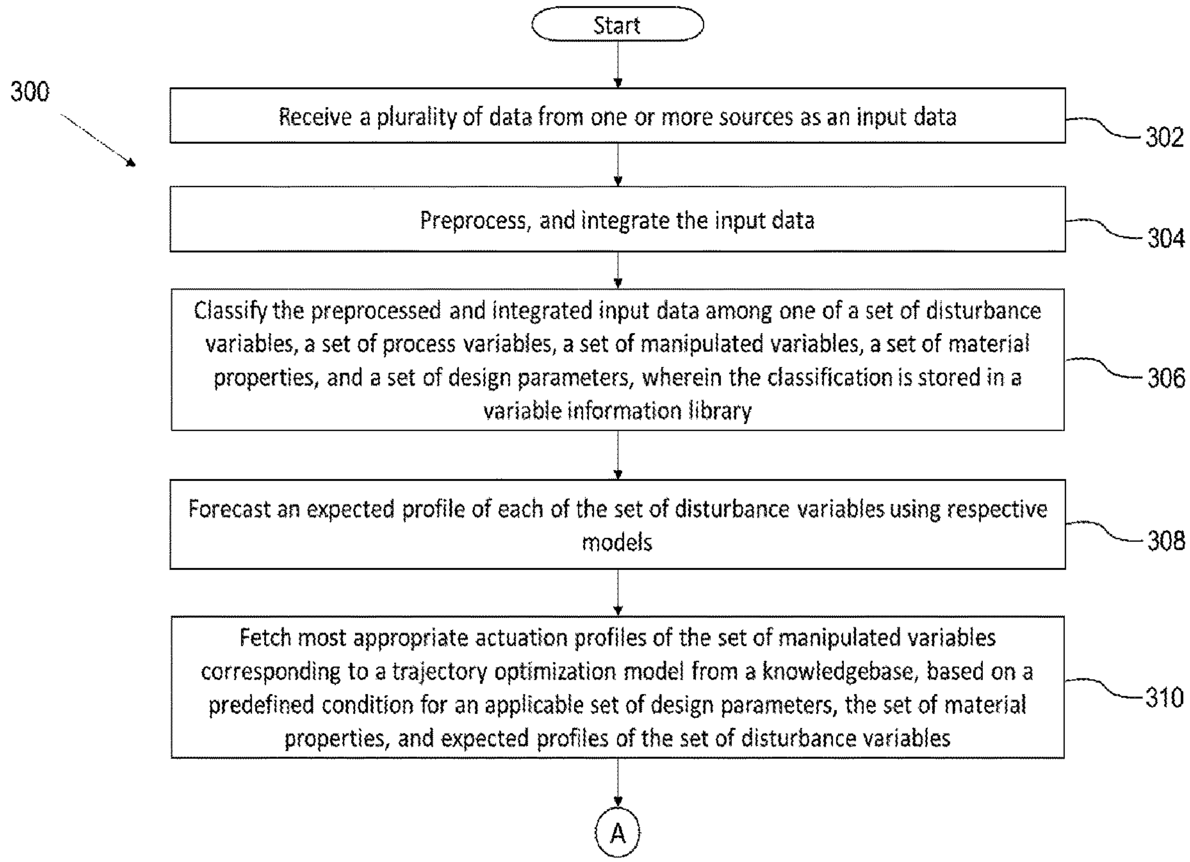
FIG. 4 shows a flowchart of a method for real time trajectory optimization of a process according to an embodiment of the present disclosure.
Figure 4B:
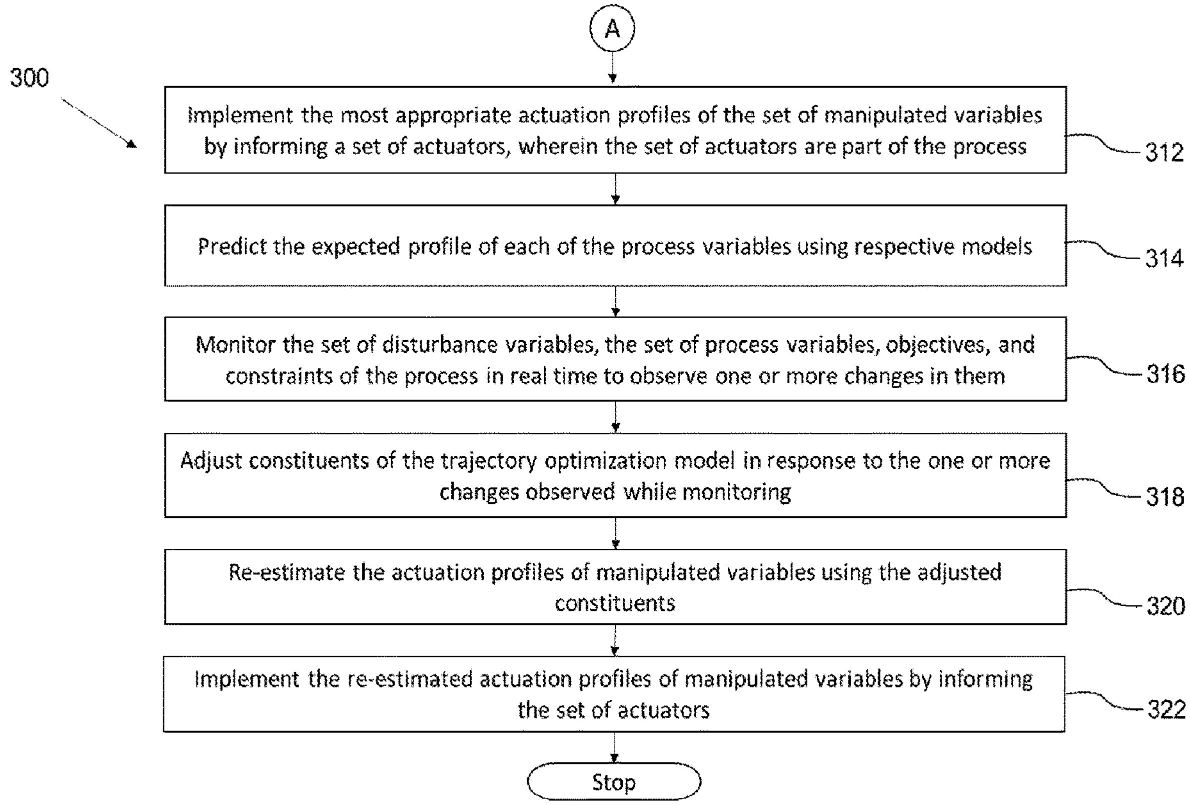

In operation, a flowchart 300 illustrating a method for real time trajectory optimization of the process is shown in the flowchart of FIG. 4A-4B. The system 100 is installed in communication with the dynamical system to achieve real time trajectory optimization of the processes of the dynamical system. At step 302, the plurality of data is received from one or more sources as the input data. At step 304, the input data is preprocessed. At step 306, the preprocessed input data is classified among the set of disturbance variables, the set of process variables, the set of manipulated variables, and the set of design parameters. The information about the classification is stored in the variable information library 124.

At step 308, the expected profile of each of the set of disturbance variables are forecasted using their respective models. At next step 310, the most appropriate actuation profiles of manipulated variables are fetched from the knowledgebase 128 based on the predefined condition for the applicable set of design parameters, material properties, and similarity scores calculated between the forecasted profile of disturbance variable and each of the profiles of disturbance variables that are stored in the knowledgebase corresponding to which optimized trajectories are already available.

In the next step 312, the most appropriate actuation profiles of the set of manipulated variables are implemented by informing the set of actuators, wherein the set of actuators are part of the process or the dynamical system. At step 314, expected profiles of the set of process variables are predicted using prediction models available in the model database. At step 316, the set of disturbance variables, the set of process variables, objectives, and constraints of the process are monitored in real-time to observe one or more changes. At step 318, constituents of the trajectory optimization model are adjusted in response to the one or more changes observed while monitoring. At step 320, the actuation profiles of manipulated variables are re-estimated using the adjusted constituents. And finally, at step 322, the re-estimated actuation profiles of manipulated variables are implemented by informing the set of actuators.

Figure 5A:
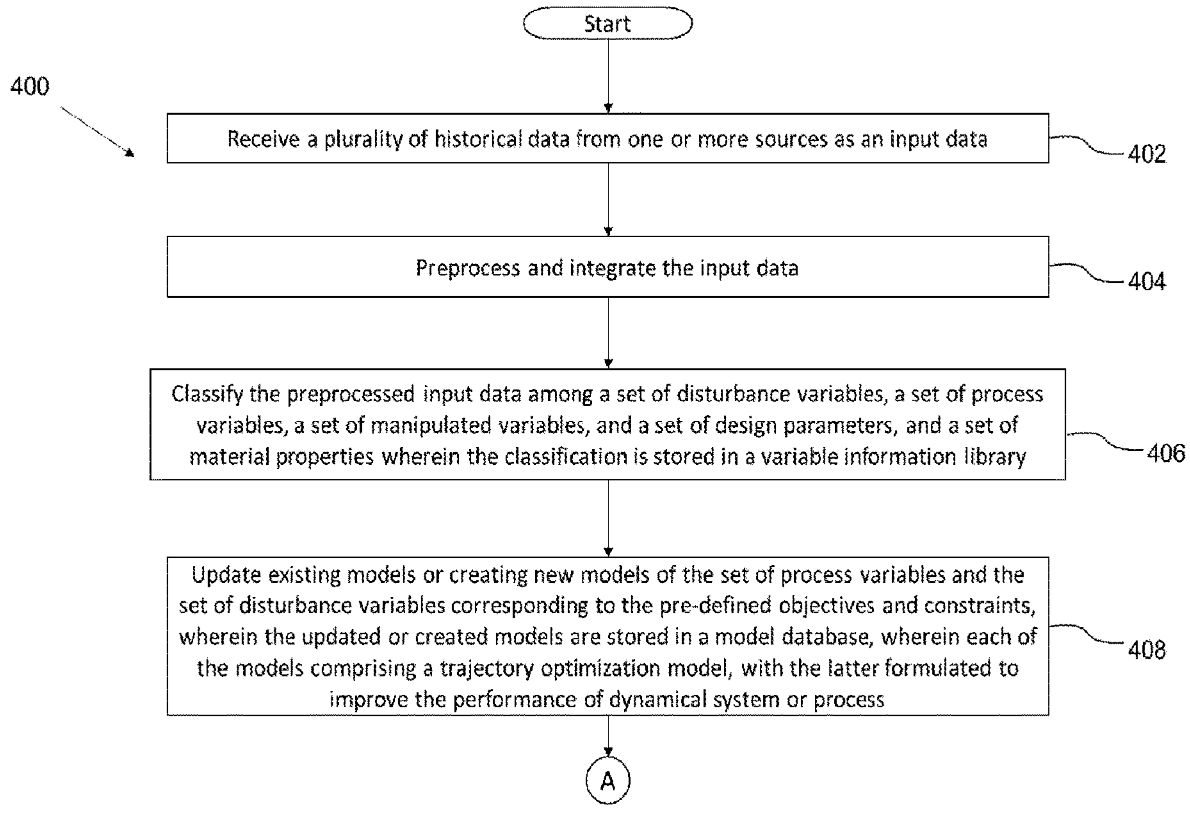
FIG. 5 shows a flowchart of a method to define and solve trajectory optimization model of a process in an offline mode according to an embodiment of the present disclosure.
Figure 5B:
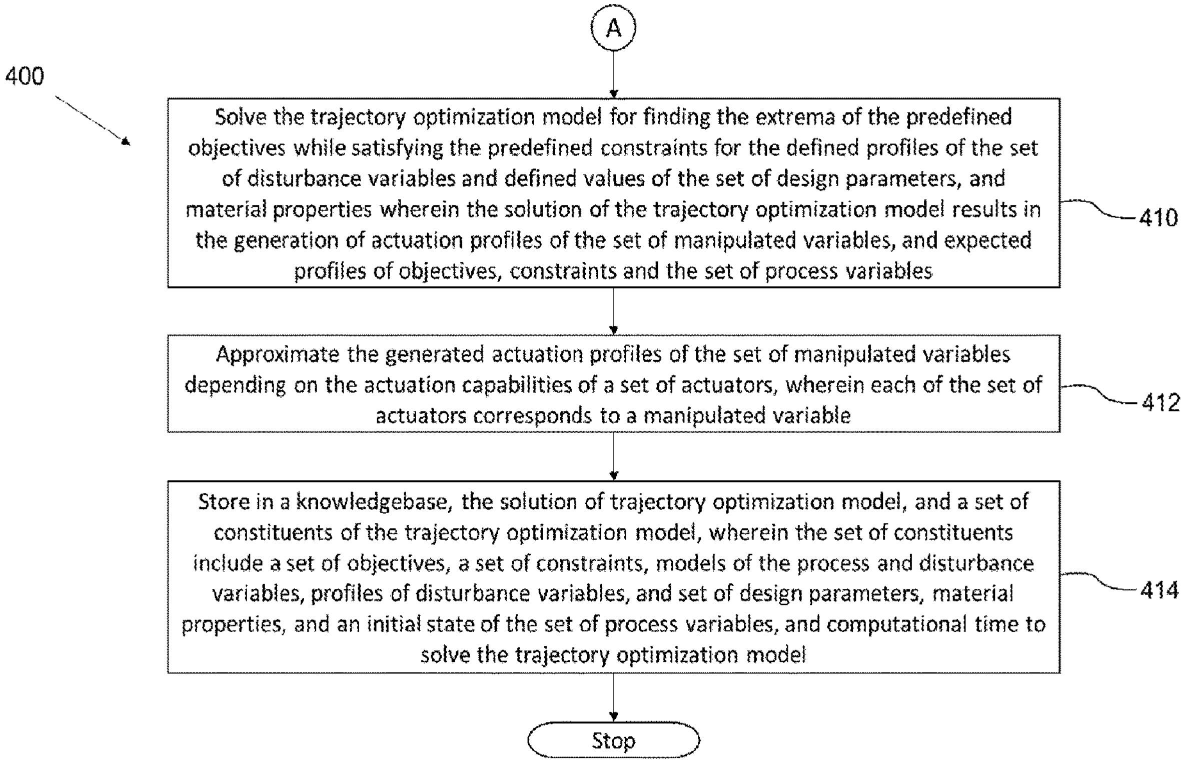

According to another embodiment of the disclosure, the method to define and solve a trajectory optimization model of the process in an offline mode is shown in the flowchart 400 of FIG. 5A-5B. The offline mode here refers to the case when the dynamical system is not operating or the dynamical system is used for the first time. At step 402, a plurality of historical data is received from one or more sources as the input data. At step 404, the input data is processed in the same way as the preprocessing was performed in the real-time operation of the system 100.

At the next step 406, the preprocessed input data is classified among the set of disturbance variables, the set of process variables, the set of manipulated variables, and the set of design parameters, and a set of material properties corresponding to the process, wherein the classification is stored in the variable information library 124. At step 408, either the existing models are updated or if the models are not existing then a set of new models of the set of process variables and the set of disturbance variables are created corresponding to pre-defined objectives and constraints. The objectives and constraints are defined such that the performance of the process or dynamical system can be improved. The updated or created models are stored in the model database 126. Each of the models of process and disturbance variables comprising a trajectory optimization model that is formulated to optimize the performance of a dynamical system or process. Trajectory optimization model further consists of objectives and constraints that are defined in terms of process variables, disturbance variables, and a set of design parameters.

In the next step 410, the trajectory optimization model is solved for finding the extrema of the predefined objectives while satisfying the predefined constraints for the defined profiles of the set of disturbance variables and defined values of the set of design parameters. The solution of the trajectory optimization model results in the generation of actuation profiles of the set of manipulated variables and expected profiles of objectives, constraints and the set of process variables. The trajectory optimization model is solved using one of control vector parameterization, direct transcription, single or multiple shooting methods, and a plurality of reinforcement learning techniques such as Q-learning, deep reinforcement learning etc. The system selects an appropriate solution method based on the type of prediction models, availability of gradients, computational requirements, nature of optimization model, and like.

At step 412, the generated actuation profiles of the set of manipulated variables are approximated depending on the actuation capabilities of the set of actuators, wherein each of the set of actuators corresponds to a manipulated variable. The approximation of generated actuation profiles may be carried out through interpolation or extrapolation methods. And finally, at step 414, the solution of the trajectory optimization model, a set of constituents of the trajectory optimization model, and computational time to solve the trajectory optimization model are stored in the knowledge-base 128. The set of constituents of trajectory optimization model include a set of objectives, constraints, design parameters, material properties, models of the process and disturbance variables, profiles of disturbance variables, and an initial state of the set of process variables.

According to an embodiment of the disclosure, the system 100 can also be explained with the help of the following example of minimizing fuel consumption of a hybrid vehicle. The hybrid electric vehicle receives power to drive the vehicle from gasoline and Li-ion battery. Given power requirements, which decides total torque demanded for driving the vehicle, an optimal time-varying profile of ratio of the torques contributed by the two sources of power can be estimated such that fuel (gasoline) consumed while traveling from point A to point B is minimized. The torque demanded to drive the vehicle depends on speed, acceleration, gear number etc. Road grade and speed can be considered as disturbances that affect the torque demanded.

Figure 6:
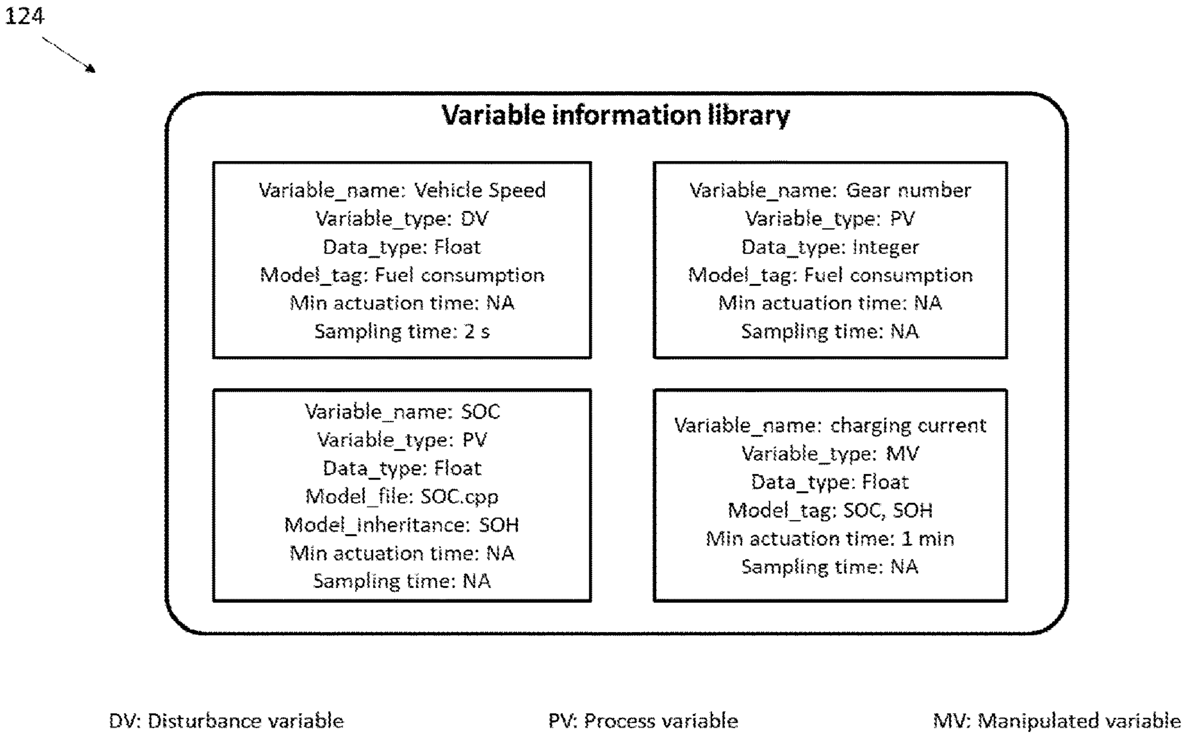
FIG. 6 shows an example of a variable information library according to an embodiment of the present disclosure.

The system is configured to operate as follows in such conditions. Design attributes/parameters such as battery type, battery capacity, drive-train of the vehicle are collected and stored using data receiver, storage and transmitter unit. The operation data (road grade, speed, and acceleration of vehicle, gear number, engine torque, motor torque, state of charge of battery (SOC), state of health (SOH)) is populated from historical runs of the vehicle if available, or sample vehicle runs are performed to collect such data and is stored in data collection, storage, and transmitter unit. The corresponding data can also be uploaded from a relevant database for the same car model. Each variable present in the operation data is classified into one of the following types, process variable, manipulated variable, disturbance variable and thus variable information library of the system is configured accordingly for the present problem. The classification of operation data is a one-time activity and is knowledge-driven. Information stored in variable information library 124 corresponding to some of the variables present in the operation data is shown in FIG. 6.

Further, objectives and constraints are defined by the user in terms of process variables, disturbance, and manipulated variables. For the present example, fuel consumption over a route can be defined using a fuel consumption map that provides fuel consumption rate in terms of engine speed, and engine torque. Further, constraints that need to be satisfied during a route need to be defined, e.g. SOC (State of Charge), a process variable, to be maintained above the permissible limit.

$$\text{Minimize, } J = \int_0^{t_f} (\dot{m}(t))$$

$$\text{Constraint, } SOC(t) > 0.3\ t \in [0, t_f]$$

wherein, J, is the total fuel consumption over the entire route going from point A to point B that is completed in $t_f$ seconds. It is obtained as integration of fuel consumption rate, $\dot{m}(t)$. SOC refers to state of charge, which defines the amount of charge relative to its present maximum capacity that the battery currently holds.

Prediction models for process variables such as engine torque, motor torque, SOC, SOH, if available, are uploaded, and their parameters/hyper-parameters are tuned based on operation data such that model performance meets acceptance criteria. The criteria can be default limits on fitting or prediction error, with a user having the freedom to change the limits. In case prediction models are not uploaded, previous prediction models can be re-tuned or trained. Auto-regressive models to forecast disturbance variables (driver's velocity) are also trained. The final version of prediction models are stored in the model database with training data, design parameter tagged.

Figure 7:
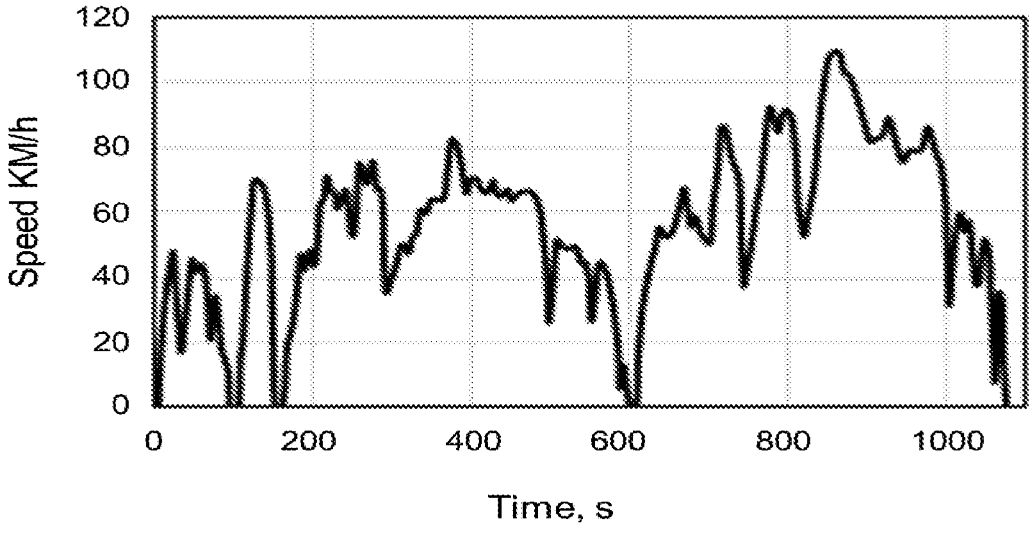
FIG. 7 shows a velocity profile of vehicle during route from point A to point B according to an embodiment of the present disclosure.
Figure 8:
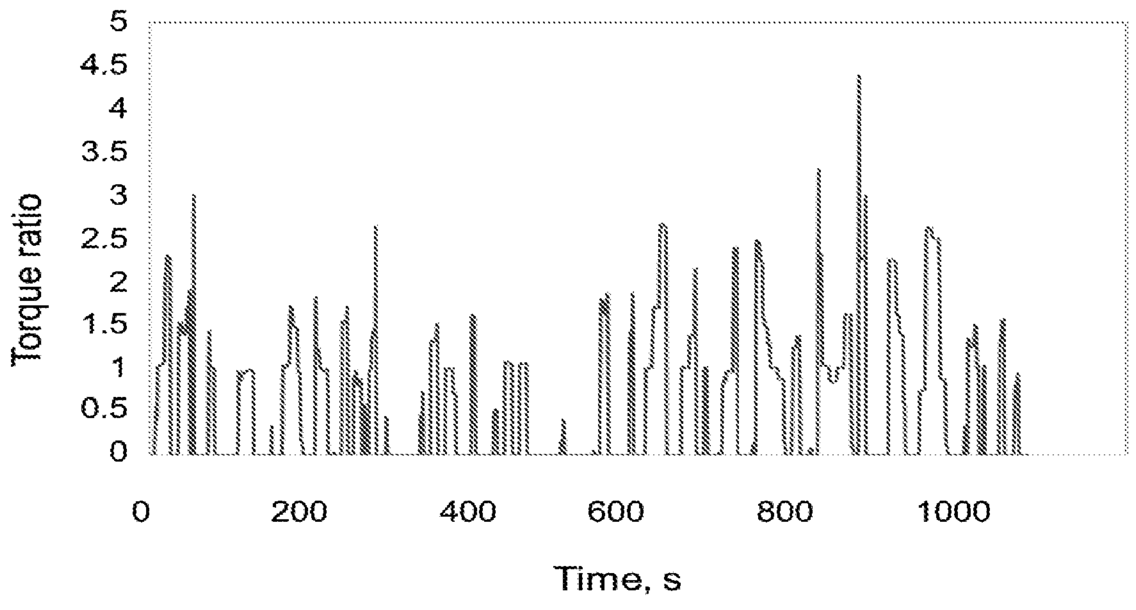
FIG. 8 shows a profile of torque ratio post solution of trajectory optimization model according to an embodiment of the present disclosure.
Figure 9:
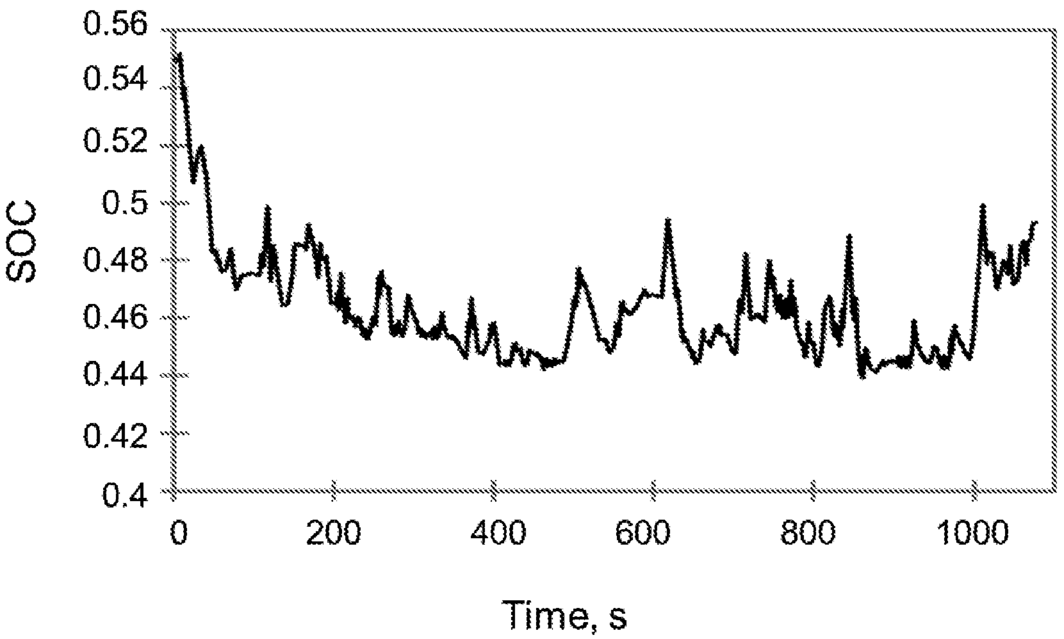
FIG. 9 shows a profile of state of charge of battery post solution of trajectory optimization model according to an embodiment of the present disclosure.

Further, for a defined disturbance profile, which is the velocity profile of vehicle during route from point A to point B as shown in FIG. 7, and other constituents, a suitable methodology to solve the trajectory optimization model is identified by the system 100. The methodology consists of technique to simulate, if not specifically defined, prediction models, the method to be used to discretize process and disturbance variables, the method to evaluate objective and constraint functions, type of optimization solver to be used, and any supporting information, gradient, reward function etc. needed for optimization is also estimated. For this particular trajectory optimization model, control vector parameterization coupled with nonlinear optimization solver is identified as a suitable technique to estimate the profile of torque ratio, a manipulated variable, over the drive cycle. The trajectory optimization model is solved given the constituents and with the methodology identified. Since the actuation profile obtained as a solution is already discretized in terms of stepwise inputs due to application of control vector parameterization technique, there is no need to further discretize it to meet the system requirements. FIG. 8 shows the profile of torque ratio (manipulated variable) post solution of the trajectory optimization model. FIG. 9 shows the profile of state of charge, a process variable, post solution of the trajectory optimization model.

The solution of the trajectory optimization model, that consists of actuation profiles of manipulated variables, and optimized trajectory of process variables (SOC), constraints, objectives (either fuel consumption with time or value of total fuel consumption during route), disturbance variable profile such as driver's speed during the route, are stored in the knowledgebase to be used by the online system. In this case, the torque ratio (actuation) to be implemented during the drive cycle, the expected profile of state of charge, and the speed profile maintained during the route are stored. Many such optimization runs can be executed for the vehicle for different velocity profile, and road grades, that the vehicle is expected to go through, and knowledgebase can be populated with the corresponding actuation profiles of torque ratio.

During online implementation, the driver selects the route, for commuting from point A to point B, corresponding to which the proposed system predicts the expected velocity profile using the projected information of traffic condition with a model that further takes into account the driver's past driving behavior. The proposed system further fetches the profile of torque ratio from the knowledgebase that is expected to minimize fuel consumption for the present and projected driving condition. The proposed system further monitors vehicle's projected velocity, fuel consumption, and state of charge. On expecting a drift in any of these variables, the proposed system identifies the source of drift, be it inaccuracy of prediction model of process variable or disturbance variable, or infeasibility to satisfy the constraints. After updating prediction models or constraints, the proposed system, re-estimates the trajectory of torque ratio and implements it to meet the objective of minimization of fuel consumption.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein solve the problems of the disturbances faced in the existing solutions for real time trajectory optimization. The disclosure provides a method and system for real time trajectory optimization of a process in the dynamical system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computers like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software units located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various units described herein may be implemented in other units or combinations of other units. For the purposes of this description, a computer-usable or computer-readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for real time trajectory optimization of a process, the method comprising:

receiving a plurality of data from one or more sources as input data;

implementing, via one or more hardware processors, an available solution during online trajectory optimization by communicating to relevant actuators present in a dynamical system, wherein the dynamical system includes an industrial system including a chemical, food or mineral processing plant, an oil refinery, a power plant, a hybrid electric vehicle, a continuous glucose monitoring sensor and an insulin pump;

monitoring performance of the dynamical system, wherein in response to the performance of the dynamical system is off-track, actuation profiles that are the most appropriate of a set of manipulated variables are updated for a remaining time of the process;

preprocessing and integrating, via the one or more hardware processors, the input data;

classifying, via the one or more hardware processors, the preprocessed and integrated input data among one of a set of disturbance variables, a set of process variables, the set of manipulated variables, a set of material properties, and a set of design parameters, wherein the classification is stored in a variable information library;

forecasting, via the one or more hardware processors, an expected profile of each of the set of disturbance variables using respective models;

fetching, via the one or more hardware processors, the most appropriate actuation profiles of the set of manipulated variables corresponding to a trajectory optimization model from a knowledgebase, based on a predefined condition for an applicable set of design parameters, the set of material properties, and the expected profiles of the set of disturbance variables;

implementing, via the one or more hardware processors, the most appropriate actuation profiles of the set of manipulated variables by informing a set of actuators, wherein the set of actuators are part of the process;

predicting, via the one or more hardware processors, an expected profile for each of the set of process variables using their respective models;

monitoring, via the one or more hardware processors, the set of disturbance variables, the set of process variables, objectives, and constraints of the process in real time to observe one or more changes;

adjusting, via the one or more hardware processors, constituents of the trajectory optimization model in response to the one or more changes observed during the monitoring;

estimating, via the one or more hardware processors, the most appropriate actuation profiles of the set of manipulated variables using the adjusted constituents, wherein the estimated most appropriate actuation profiles of the set of manipulated variables enables correcting a course of the process by transmitting the estimated most appropriate actuation profiles to the set of actuators; and implementing, via the one or more hardware processors, the estimated most appropriate actuation profiles of the set of manipulated variables by the transmission of the estimated most appropriate actuation profiles to the set of actuators, wherein the real time trajectory optimization of the dynamical system includes operating the hybrid electrical vehicle to minimize fuel consumption, wherein the input data comprises i) design parameters comprising battery type, battery capacity, and drive-train of the hybrid electrical vehicle, and ii) operational data comprising road grade, speed, acceleration, gear number, engine torque, motor torque, State of Charge of battery (SOC), State of Health (SOH), wherein the set of process variables comprise the SOC, the engine torque, the motor torque and the fuel consumption, wherein the set of manipulated variables comprise a torque ratio, and wherein the set of disturbance variables comprise of a driver's velocity and traffic profile, wherein the actuation profiles of manipulated variables, optimized trajectory of process variables, constraints, objectives, and disturbance variable profile during movement along a route are determined using the trajectory optimization model, wherein during online implementation an expected velocity profile is predicted for the route and a profile of the torque ratio is fetched from the knowledgebase that minimizes the fuel consumption for a present and projected driving condition, wherein the set of process variables and the set of disturbance variables are monitored using vehicle sensors to detect drift from expected values and upon detection of the drift, a source of the drift is identified comprising at least one of inaccuracy of prediction model of process variable or disturbance variable, infeasibility to satisfy constraints, and wherein estimating, using the adjusted trajectory optimization model, a new actuation profile of the torque ratio for a remaining portion of the route and implementing the estimated actuation profile to meet the objective of minimization of the fuel consumption.

2. The method according to claim 1, wherein the expected profile of the set of disturbance variables is forecasted using one of current data or by making predictions using models of the set of disturbance variables present in a model database.

3. The method according to claim 1, wherein the most appropriate actuation profiles of the set of manipulated variables is identified by:

calculating similarity scores between the forecasted expected profiles of the set of disturbance variables and each respective profiles already stored in the knowledgebase for a similar set of design parameters and the set of material properties, and selecting the most appropriate actuation profiles for which the calculated similarity score is found to be maximum, wherein the similarity score is calculated in terms of distance measure comprising one of Euclidean distance or Mahalanobis distance, or any similar distance measure or a weighted sum of distance measures computed using different distance estimation techniques.

4. The method according to claim 1, wherein the monitoring is performed by computing a difference between the forecasted expected profiles and measured profiles of the set of disturbance variables as per recent data;

computing a difference between the expected profiles and currently measured profiles of the set of process variables with the expected profiles estimated by performing model predictions on the recent data; and checking whether all the constraints are satisfied and quantifying an amount by which each constraint is violated, in response to the constraints are not satisfied.

5. The method according to claim 4, wherein the computed difference can represent an instantaneous difference or an integrated difference.

6. The method according to claim 1, wherein the adjustment of the constituents of the trajectory optimization model comprises at least one of:

updating the forecast of the set of disturbance variables using recent data or by updating the respective models of the set of disturbance variables if a difference between the expected profile and actual profile of disturbance variables is more than a first threshold;

updating the respective models of the set of process variables if a difference between expected profile and actual profile of the set of process variables is more than a second threshold, wherein the respective models of the set of process variables include one or more of machine learning (ML) models, deep learning (DL) models, and first-principles based models; and relaxing limits on the constraints in response to the constraints are not satisfied and there is a scope for relaxing the limits on the constraints.

7. The method according to claim 6, wherein the respective models are updated by one or more of tuning hyper-parameters of machine or deep learning models or by tuning parameters of the first-principles based models.

8. The method according to claim 1, wherein the estimation of the most appropriate actuation profiles is performed by one of a plurality of methods depending on limitations on computational time and actuation requirements of relevant sensors, wherein the plurality of methods comprise:

solving the trajectory optimization model with the adjusted constituents for a relatively short horizon; and solving the trajectory optimization model for a remaining horizon with adjusted constituents and most recent data from sensors.

9. The method according to claim 1, wherein the one or more sources comprise of one or more of a distributed control system (DCS), a supervisory control and data acquisition (SCADA) system, a laboratory information management system (LIMS), an enterprise resource planning (ERP) system, a manufacturing execution system (MES), a manufacturing operations management (MOM) system, or a plurality of sensors.

10. The method according to claim 1, wherein the pre-processing of the input data further comprises:

applying an outlier detection and removal method on the input data to identify and remove unreliable data and to identify any anomalous behavior of the one or more sources;

detecting functioning of each of a plurality of sensors, among the one or more sources, using a sensor monitoring method and historical performance data of each of the plurality of sensors; and performing data imputation using a multivariate imputation method for the input data to fill in missing data.

11. The method according to claim 1, wherein the models for the set of disturbance variables include one or more auto-regressive machine learning or deep learning models.

12. The method according to claim 1, further comprises updating existing models or creating new models of the set of process variables and the set of disturbance variables corresponding to pre-defined objectives and constraints by:

receiving a plurality of historical data from the one or more sources as historical input data;

preprocessing and integrating, via the one or more hardware processors, the historical input data;

classifying, the via one or more hardware processors, the preprocessed and integrated historical input data among a set of disturbance variables, a set of process variables, a set of manipulated variables, a set of design parameters, and a set of material properties corresponding to the process, wherein the classification is stored in the variable information library;

updating, via the one or more hardware processors, the existing models or creating the new models of the set of process variables and the set of disturbance variables corresponding to predefined objectives and constraints, wherein the updated existing models or the created new models are stored in a model database, wherein each of the existing models or the new models comprises of a respective trajectory optimization model.

13. The method of claim 12, wherein the models are retuned or updated based on a prediction error, wherein the prediction error is a difference between measured values and predictions made by a corresponding model.

14. The method according to claim 12, further comprising defining objectives and constraints of the process in terms of the set of process variables, the set of manipulated variables and the set of design parameters.

15. The method according to claim 12, wherein the trajectory optimization model is solved using one of control vector parameterization, direct transcription, single or multiple shooting methods, or a plurality of reinforcement learning techniques.

16. The method according to claim 12, wherein approximation of generated actuation profiles is carried out through interpolation or extrapolation methods.

17. A system for real time trajectory optimization of a process, the system comprising:

one or more hardware processors;

a memory in communication with the one or more hardware processors, wherein the one or more hardware processors are configured to:

implement an available solution during online trajectory optimization by communicating to relevant actuators present in a dynamical system, wherein the dynamical system includes an industrial system including a chemical, food or mineral processing plant, an oil refinery, a power plant, a hybrid electric vehicle, a continuous glucose monitoring sensor and an insulin pump;

monitor performance of the dynamical system, wherein in response to the performance of the dynamical system is off-track, actuation profiles that are the most appropriate of a set of manipulated variables are updated for a remaining time of the process;

preprocess and integrate input data, wherein the input data comprises a plurality of data received from one or more sources;

classify the preprocessed input data among a set of disturbance variables, a set of process variables, the set of manipulated variables, a set of material properties, and a set of design parameters, wherein the classification information is stored in a variable information library;

forecast an expected profile of each of the set of disturbance variables using their respective models;

fetch the most appropriate actuation profiles of the set of manipulated variables from a knowledgebase based on a predefined condition for an applicable set of design parameters and forecasted expected profiles of the set of disturbance variables;

implementing the most appropriate actuation profiles of the set of manipulated variables by informing a set of actuators, wherein the set of actuators are part of the process;

predict an expected profile for each of the set of process variables using their respective models;

monitor the set of disturbance variables, the set of process variables, objectives, and constraints of the process in real time to observe one or more changes;

adjust constituents of the trajectory optimization model in response to the one or more changes observed during the monitoring; and estimate the most appropriate actuation profiles of the set of manipulated variables using the adjusted constituents, wherein the estimated most appropriate actuation profiles of the set of manipulated variables enables correcting a course of the process by transmitting the estimated most appropriate actuation profiles to the set of actuators, wherein the real time trajectory optimization of the dynamical system includes operating the hybrid electrical vehicle to minimize fuel consumption, wherein the input data comprises i) design parameters comprising battery type, battery capacity, and drive-train of the hybrid electrical vehicle, and ii) operational data comprising road grade, speed, acceleration, gear number, engine torque, motor torque, State of Charge of battery (SOC), State of Health (SOH), wherein the set of process variables comprise the SOC, the engine torque, the motor torque and the fuel consumption, wherein the set of manipulated variables comprise a torque ratio, and wherein the set of disturbance variables comprise of a driver's velocity and traffic profile, wherein the actuation profiles of manipulated variables, optimized trajectory of process variables, constraints, objectives, and disturbance variable profile during movement along a route are determined using the trajectory optimization model, wherein during online implementation an expected velocity profile is predicted for the route and a profile of the torque ratio is fetched from the knowledgebase that minimizes the fuel consumption for a present and projected driving condition, wherein the set of process variables and the set of disturbance variables are monitored using vehicle sensors to detect drift from expected values and upon detection of the drift, a source of the drift is identified comprising at least one of inaccuracy of prediction model of process variable or disturbance variable, infeasibility to satisfy constraints, and wherein estimating, using the adjusted trajectory optimization model, a new actuation profile of the torque ratio for a remaining portion of the route and implementing the estimated actuation profile to meet the objective of minimization of the fuel consumption.

18. A computer program product comprising a non-transitory computer readable medium having a computer readable program embodied therein, wherein the computer readable program, when executed on a computing device, causes the computing device to:

implement an available solution during online trajectory optimization by communicating to relevant actuators present in a dynamical system, wherein the dynamical system includes an industrial system including a chemical, food or mineral processing plant, an oil refinery, a power plant, a hybrid electric vehicle, a continuous glucose monitoring sensor and an insulin pump;

monitoring performance of the dynamical system, wherein in response to the performance of the dynamical system is off-track, actuation profiles that are the most appropriate of a set of manipulated variables are updated for a remaining time of the process;

preprocess and integrate input data, wherein the input data comprises a plurality of data received from one or more sources;

classify the preprocessed and integrated input data among one of a set of disturbance variables, a set of process variables, the set of manipulated variables, a set of material properties, and a set of design parameters, wherein the classification is stored in a variable information library;

forecast an expected profile of each of the set of disturbance variables using respective models;

fetch the most appropriate actuation profiles of the set of manipulated variables corresponding to a trajectory optimization model from a knowledgebase, based on a predefined condition for an applicable set of design parameters, the set of material properties, and expected profiles of the set of disturbance variables;

implement the most appropriate actuation profiles of the set of manipulated variables by informing a set of actuators, wherein the set of actuators are part of the process;

predict an expected profile for each of the set of process variables using their respective models;

monitor the set of disturbance variables, the set of process variables, objectives, and constraints of the process in real time to observe one or more changes;

adjust constituents of a trajectory optimization model in response to the one or more changes observed during the monitoring;

estimate the most appropriate actuation profiles of the set of manipulated variables using the adjusted constituents, wherein the estimated most appropriate actuation profiles of the set of manipulated variables enables correcting a course of the process by transmitting the estimated most appropriate actuation profiles to the set of actuators; and implement the estimated most appropriate actuation profiles of the set of manipulated variables by the transmission of the estimated most appropriate actuation profiles to the set of actuators, wherein the real time trajectory optimization of the dynamical system includes operating the hybrid electrical vehicle to minimize fuel consumption, wherein the input data comprises i) design parameters comprising battery type, battery capacity, and drive-train of the hybrid electrical vehicle, and ii) operational data comprising road grade, speed, acceleration, gear number, engine torque, motor torque, State of Charge of battery (SOC), State of Health (SOH), wherein the set of process variables comprise the SOC, the engine torque, the motor torque and the fuel consumption, wherein the set of manipulated variables comprise a torque ratio, and wherein the set of disturbance variables comprise of a driver's velocity and traffic profile, wherein the actuation profiles of manipulated variables, optimized trajectory of process variables, constraints, objectives, and disturbance variable profile during movement along a route are determined using the trajectory optimization model, wherein during online implementation an expected velocity profile is predicted for the route and a profile of the torque ratio is fetched from the knowledgebase that minimizes the fuel consumption for a present and projected driving condition, wherein the set of process variables and the set of disturbance variables are monitored using vehicle sensors to detect drift from expected values and upon detection of the drift, a source of the drift is identified comprising at least one of inaccuracy of prediction model of process variable or disturbance variable, infeasibility to satisfy constraints, and wherein estimating, using the adjusted trajectory optimization model, a new actuation profile of the torque ratio for a remaining portion of the route and implementing the estimated actuation profile to meet the objective of minimization of the fuel consumption.

19. The method of claim 12, further comprises:

solving, via the one or more hardware processors, the trajectory optimization model for finding an extrema of the predefined objectives while satisfying predefined constraints for defined profiles of the set of disturbance variables and defined values of the set of design parameters and the set of material properties, wherein a solution of the trajectory optimization model results in generating actuation profiles of the set of manipulated variables and expected profiles of objectives, constraints and the set of process variables;

approximating, via the one or more hardware processors, the generated actuation profiles of the set of manipulated variables depending on actuation capabilities of a set of actuators, wherein each of the set of actuators corresponds to a manipulated variable; and storing, via the one or more hardware processors, in the knowledgebase, a solution of trajectory optimization model, a set of constituents of the trajectory optimization model, wherein the set of constituents include a set of objectives, constraints, design parameters, a set of material properties, models of the process and disturbance variables, profiles of disturbance variables, and an initial state of the set of process variables, and computational time to solve the trajectory optimization model, wherein defining and solving the trajectory optimization model of the process is performed in offline mode.

* * * * *